(12) United States Patent
Kolbenschlag et al.

(10) Patent No.: US 10,001,419 B2
(45) Date of Patent: Jun. 19, 2018

(54) SPRING BODY FOR A FORCE TRANSDUCER, SUCH AS A TORQUE-AND/OR TENSION/COMPRESSION-FORCE MEASURING CELL

(71) Applicant: Samson Aktiengesellschaft, Frankfurt am Main (DE)

(72) Inventors: Stefan Kolbenschlag, Darmstadt (DE); Rainer Oberheim, Bensheim (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 0 days. days.

(21) Appl. No.: 14/757,731

(22) Filed: Dec. 23, 2015

(65) Prior Publication Data

US 2016/0178458 A1  Jun. 23, 2016

(30) Foreign Application Priority Data

Dec. 23, 2014  (DE) .......................... 10 2014 019546

(51) Int. Cl.
*G01L 1/04* (2006.01)
*G01L 3/02* (2006.01)
(Continued)

(52) U.S. Cl.
CPC .................. *G01L 1/04* (2013.01); *F16F 1/18* (2013.01); *F16F 3/023* (2013.01); *G01L 1/048* (2013.01);
(Continued)

(58) Field of Classification Search
CPC .. F16F 1/34; F16F 7/12; F16F 15/1216; F16F 15/1335; F16F 15/1337; F16F 2235/08; F16F 7/12; G01L 1/048; G01L 3/1435
See application file for complete search history.

(56) References Cited

U.S. PATENT DOCUMENTS 3,672,213 A * 6/1972 Watson .................... G01L 3/108
73/862.339
3,729,990 A * 5/1973 Oliver ....................... G01L 5/16
244/236

(Continued)

FOREIGN PATENT DOCUMENTS

DE  2039274 A1  4/1971
DE  3820838 A1  1/1990

(Continued)

*Primary Examiner* — Harshad R Patel
*Assistant Examiner* — Tran M Tran
(74) *Attorney, Agent, or Firm* — Schiff Hardin LLP

(57) ABSTRACT

In a spring body for a force transducer built into a force-transmitting part, a force-input section is provided for receiving a force, a force-output section for transmitting the force, and an elastic deformation body arranged therebetween which couples the force-output section to the force-input section such that the force received by the force-input section is transmitted to the force-output section. The elastic deformation body performs a predetermined elastic deformation movement caused by the force to be transmitted at at least one point. A coding sampling section is provided at the at least one point of the deformation body and which follows deformation movements of the at least one point.

16 Claims, 3 Drawing Sheets

(51) Int. Cl.
*F16L 3/02* (2006.01)
*F16F 1/18* (2006.01)
*F16F 3/02* (2006.01)
*G01L 3/14* (2006.01)
*G01L 5/22* (2006.01)
*G01L 5/16* (2006.01)

(52) U.S. Cl.
CPC .......... *G01L 3/1407* (2013.01); *G01L 3/1421* (2013.01); *G01L 3/1435* (2013.01); *G01L 5/161* (2013.01); *G01L 5/221* (2013.01)

(56) References Cited

U.S. PATENT DOCUMENTS

| | | | | |
|---|---|---|---|---|
| 4,398,429 A * | 8/1983 | Cook | ................ | G01G 19/44 600/595 |
| 4,523,653 A * | 6/1985 | Scrivener | ................ | G01G 19/14 177/147 |
| 4,823,618 A * | 4/1989 | Ramming | ................ | G01L 5/161 73/862.044 |
| 4,977,782 A | 12/1990 | Stohr et al. | | |
| 5,020,378 A * | 6/1991 | Hesthamer | ................ | G01L 3/102 324/209 |
| 5,228,349 A * | 7/1993 | Gee | ................ | G01L 3/101 324/207.22 |
| 5,827,981 A * | 10/1998 | March | ................ | G01L 1/25 73/862.632 |
| 5,925,832 A * | 7/1999 | Bruns | ................ | G01L 1/042 73/862.632 |
| 6,223,607 B1 * | 5/2001 | Yasui | ................ | G01L 3/1435 73/862.333 |
| 6,260,423 B1 * | 7/2001 | Garshelis | ................ | G01L 3/102 324/207.21 |
| 6,450,044 B1 * | 9/2002 | Eisenhauer | ................ | G01L 3/12 73/862.193 |
| 6,752,171 B1 * | 6/2004 | Kemmler | ................ | F15B 20/002 137/552 |
| 6,759,648 B2 * | 7/2004 | Baxter | ................ | G01D 5/3473 250/231.13 |
| 6,823,746 B2 * | 11/2004 | Viola | ................ | G01L 3/105 73/862.335 |
| 6,871,555 B2 * | 3/2005 | May | ................ | G01L 3/102 73/862.333 |
| 6,904,814 B2 * | 6/2005 | May | ................ | G01L 3/101 73/862.333 |
| 6,935,195 B2 * | 8/2005 | Tokumoto | ................ | G01D 5/2452 73/862.334 |
| 6,988,417 B2 * | 1/2006 | Kushwaha | ................ | G01N 33/24 73/847 |
| 7,121,147 B2 * | 10/2006 | Okada | ................ | G01L 5/165 73/760 |
| 7,219,561 B2 * | 5/2007 | Okada | ................ | G01L 5/165 73/862.043 |
| 7,322,250 B1 * | 1/2008 | Discenzo | ................ | G01L 1/241 73/800 |
| 8,156,802 B2 | 4/2012 | Werber et al. | | |
| 8,203,334 B2 * | 6/2012 | Baller | ................ | G01D 5/145 324/174 |
| 8,393,232 B2 * | 3/2013 | Hu | ................ | G01L 3/1471 73/862.08 |
| 8,607,640 B2 * | 12/2013 | Eriksen | ................ | G01B 7/22 244/100 R |
| 8,666,682 B2 * | 3/2014 | LaVigne | ................ | G01L 3/109 702/41 |
| 8,677,836 B2 * | 3/2014 | Yu | ................ | G01L 3/104 73/862.193 |
| 8,978,480 B2 * | 3/2015 | Michopoulos | ................ | G01N 3/08 73/857 |
| 9,086,101 B2 * | 7/2015 | Zhu | ................ | F16F 1/027 |
| 9,176,024 B2 * | 11/2015 | Jensen | ................ | F01D 17/02 |
| 9,200,969 B2 * | 12/2015 | Ueno | ................ | G01L 5/16 |
| 2003/0010137 A1 * | 1/2003 | Dalton | ................ | G01L 3/12 73/862.324 |
| 2008/0075561 A1 * | 3/2008 | Takemura | ................ | F16F 1/025 414/2 |
| 2015/0241299 A1 * | 8/2015 | Deckers | ................ | G01M 5/0058 254/97 |

FOREIGN PATENT DOCUMENTS

| | | |
|---|---|---|
| DE | 3837683 A1 | 5/1990 |
| DE | 3937318 C1 | 5/1991 |
| DE | 102005005715 A1 | 8/2006 |
| DE | 102010041970 A1 | 4/2012 |
| EP | 1344711 A2 | 9/2003 |
| EP | 2364737 A1 | 9/2011 |
| GB | 957761 A | 5/1964 |
| GB | 1083756 A | 9/1967 |

\* cited by examiner

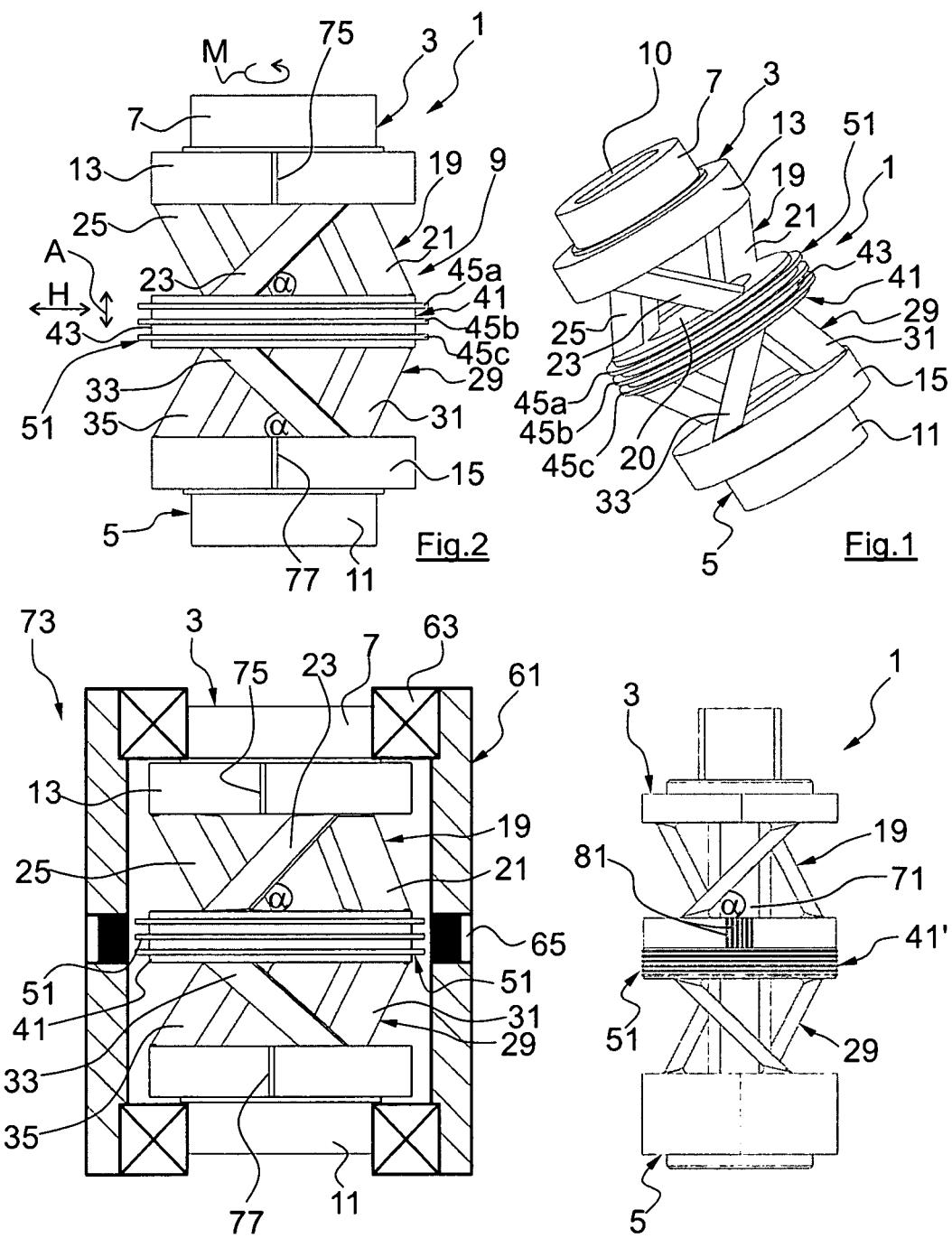

SPRING BODY FOR A FORCE TRANSDUCER, SUCH AS A TORQUE-AND/OR TENSION/COMPRESSION-FORCE MEASURING CELL

BACKGROUND

The disclosure relates in general to a spring body for a force transducer or a load cell, particularly for use in the field of process technology, particularly field-device technology, in which an actuating drive moves an actuator, such as a control valve, into a desired position, in order to be able to set a process fluid flow of a processing plant. In particular, the force transducer is integrated as a force coupler in a drive force-transmission structure, such as an actuating-rod structure or actuating-shaft structure, which for example couples an actuating drive, such as a pneumatic actuating drive, to an actuating armature, such as a control valve, of a processing plant for example and transmits the forces from the force generator to the force consumer. The force transducer according to the disclosure can furthermore be used in many fields both of everyday life and in other branches of industry or for research purposes. Force transducers or load cells are generally known as a torque sensor, tension and/or compression force sensor, particularly as a torque sampling cell or tension and/or compression force measuring cell.

In particular, the disclosure relates to a force transducer, in which a torque should be detected, which operates a pivoting movement of a component which is to be set, wherein a pivoting-movement amplitude is limited to less than 360°. Preferably, the maximum rotational-movement amplitude of the actuating drive is limited to 270°, 180°, 120°, 100° or 90° or below. The force transducer can furthermore also be used for any dynamic, rotational-speed-independent measuring tasks, as well as static force measuring tasks.

In the technical field of steering assistance systems, a sensor arrangement for detecting a rotation of a first shaft and a second shaft is known according to DE 10 2010 041 970 A1, in which steering movements of more than 360° are carried out. A torsion rod is coupled in a force-transmitting manner between the mutually separated shafts, which torsion rod transmits the entire force to be transmitted between the two shafts. A retaining device for a magnetic carrier is attached at the facing ends of the shafts. The retaining apparatus is not designed to transmit the actuating forces to be detected between the shafts, but rather is used to amplify a relative movement permitted by the torsion rod between the two facing shaft ends by means of a movement of the magnet carrier. The retaining device is constructed as a web arrangement, which in the case of a rotational movement of the two shafts, permits a translational vertical displacement of the magnet carrier. A sensor apparatus assigned to the magnet carrier detects the change of the magnet field, in order, on the basis of the detected vertical displacement of the magnet, to detect the elastic twisting of the shaft ends permitted by the torsion rod.

A method and a device for detecting static and dynamic torques is known from DE 10 2005 005 715 A1. A rotationally rigid and a rotationally elastic compensation coupling are used. When introducing a torque into the ends of a deformation body of a rotationally elastic compensation coupling, an axial displacement of a central region, which shall be large enough to allow it to be detected using mechanical measuring means, is achieved for an overall length, which is kept constant. The rotationally rigid, but axially elastic compensation coupling compensates the axial displacement permitted by the rotationally elastic compensation coupling again. A washer is mounted by means of a ball bearing at the central region, which washer follows an axial displacement of the central region and remains at a determined circumferential position, in order to be read off by a dial gauge arranged fixed to the housing. The known force transducer is complicated in manufacturing terms due to the multitude of mechanical and kinematic components and it requires a high calibration outlay, in order to obtain precise measurement results. In addition, axial forces which are to be transmitted between the shafts cannot be measured using the known torsional stress meter.

It is known in process technology to detect torques and therefore the measurement of torsional stresses in shafts in a punctiform manner by means of strain gauges, as DE 38 20 838 A1 teaches for example. An electrical resistance within the strain gauge changes because of surface stresses at the point of measurement, which allows conclusions about the torsional load on the actuating shaft forming the surface. The signals at the rotating strain gauge can be forwarded to a position controller by means of induction, radio or a slip ring. This known torque measurement cannot be used in all technical fields of use. The adhesive bonding of the strain gauge is only suitable for certain temperatures. Also, a chemical resistance of the strain-gauge connection is not provided for all surrounding materials. The application of the strain gauge to the deformation carrier is to be carried out with outlay. Wireless transmissions of slip-ring transmissions are not reliable and not permissible in all fields of use, such as in explosive atmospheres, for example in processing plants. In addition, although the measured data are obtained directly at the force-transmitting shaft, they are collected only at a very spatially delimited, punctiform point with regards to the deformation, and therefore are to be considered with a tolerance deduction due to possible material inhomogeneities and must be forwarded by means of energy consumption from the point of measurement of the deformation carrier to a use apparatus.

SUMMARY

It is an object to overcome the disadvantages of the prior art, particularly to provide a spring body for a force transducer preferably for process technology and to provide a force transducer, such as a torque—and tension/compression force—measuring cell, using which the disadvantages of the prior art are overcome, with which particularly a reliable force measurement is achieved, wherein the design and installation outlay is to be kept as low as possible.

In a spring body for a force transducer built into a force-transmitting part, a force-input section is provided for receiving a force, a force-output section for transmitting the force, and an elastic deformation body arranged therebetween which couples the force-output section to the force-input section such that a force received by the force-input section is transmitted to the force-output section. The elastic deformation body performs a predetermined elastic deformation movement caused by the force to be transmitted at at least one point. A coding sampling section is provided at the at least one point of the deformation body and which follows deformation movements of the at least one point.

BRIEF DESCRIPTION OF THE DRAWINGS

FIG. 1 shows a perspective view of a spring body according to an exemplary embodiment;

FIG. 2 shows a side view of the spring body according to FIG. 1;

FIG. 3 shows a partial cross-sectional view of a force transducer according to the exemplary embodiment with the spring body according to FIGS. 1 and 2;

FIG. 4 shows a spring body according to a further exemplary embodiment, wherein the spring body can be used in functional union both as torque measuring shaft and as compression/tension force measuring rod;

DESCRIPTION OF EXEMPLARY EMBODIMENTS

Figures 5A, 5B:
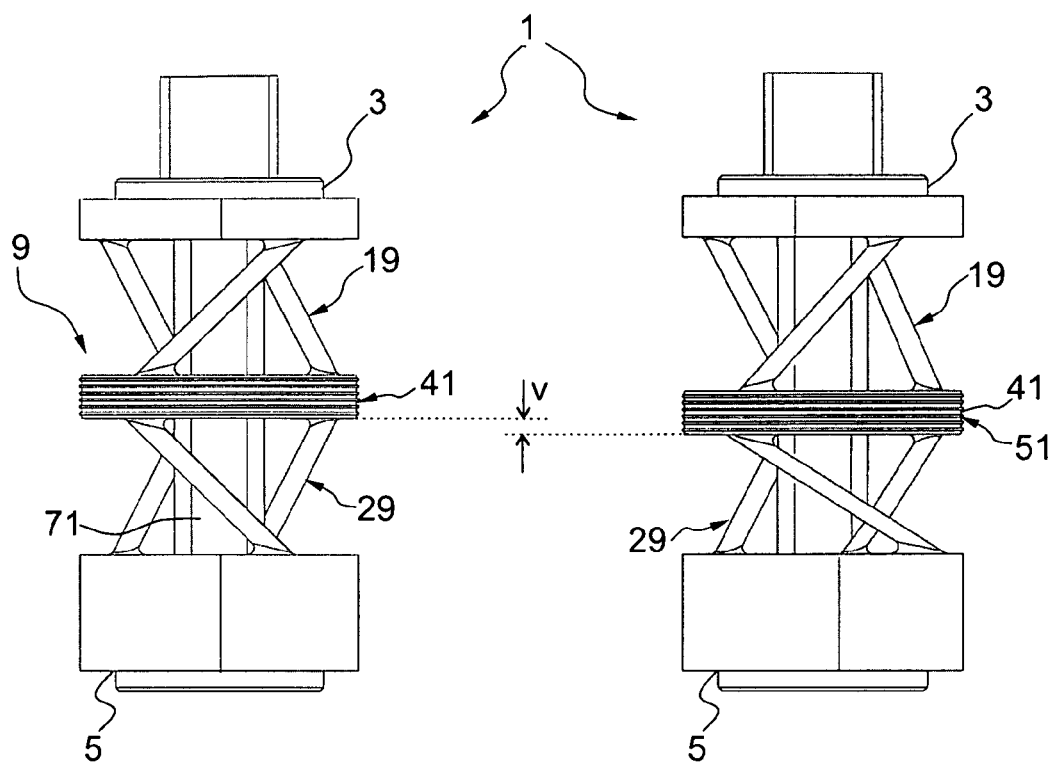
FIGS. 5a and 5b show side views of the spring body according to the exemplary embodiment according to FIG. 4 in two operating states in the case of torque loading.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in illustrated embodiments and such further applications of the principles of the invention as illustrated as would normally occur to one skilled in the art to which the invention relates are included herein.

Accordingly, a spring body for a force transducer or a load cell, such as a torque, tension and/or compression force measuring cell, is provided. The spring body can be designed to be integrated into a force-transmitting part, such as a shaft or actuating rod, or is already included as an integral constituent in the force-transmitting part. The spring body according to the exemplary embodiment comprises a force-input section for receiving the force to be measured, a force-output section for transmitting the force, and an elastic deformation body arranged therebetween, which couples the force-output section to the force-input section in such a manner that the force received by the force-input section is transmitted in particular essentially completely to the force-output section. On the basis of the knowledge of the modulus of elasticity of the deformation body in particular between the force-output section and the force-input section, it is possible, because of the locally delimited elastic deformation of the deformation body, to draw exact conclusions about the forces causing the elastic deformation. For example, the deformation of the deformation body, particularly of spring webs and their defined deformation character, caused proportionally to the force introduction can be determined by means of a FEM analysis on the basis of the pre-known E modulus.

The deformation body can in particular be configured in such a manner that it has a lower elastic deformation stiffness with respect to the forces to be measured, such as torques and/or tension or compression forces, than the force output section, the force input section and the respective adjacent force-transmitting connectors. If the deformation body is integrally connected to the force-introduction areas, all constituents of the force-transmitting part have the same E modulus, but, possibly, different deformation stiffnesses. It is the geometry, which is to be set, of the deformation body—which is formed by an arrangement of a plurality of spring webs in an example which is described further below—which permits the deformation movement that is to be detected. Due to the shape of the deformation body for example by configuring an arrangement of a plurality of spring webs, it is achieved that a deformation movement that is to be detected mainly takes place in the particularly "weakened" deformation body and that this elastic deformation movement clearly dominates in such a manner that the slight elastic deformations of the force input section, the force output section and the force-transmitting parts are negligible, particularly in the calculation of the force to be determined.

In this case, the deformation body can be axially fixed in such a manner that conclusions about the force that has been conveyed and which is to be determined are computationally possible using the axial length and the shape of the deformation body, such as the alignment and structuring of the spring-web arrangement and the modulus of elasticity thereof. For example, in the case of a torque to be determined, the force-input section and the force output section are formed rotationally, particularly annular in order to form great torsional stiffness. The design of the deformation body in the preferred embodiment will be covered in the following. This can for example be formed in a solid body of reduced external dimensions, in order to provide a lower deformation stiffness than the force-input and output sections.

The force input section and/or the force output section can structurally be formed by axial connection faces of the deformation body itself. Preferably, the deformation body of the spring body according to the exemplary embodiment is a measuring shaft or measuring rod to be integrated between two actuating-rod ends, actuating-shaft ends, or drive-shaft ends that are to be connected, and are to be produced separately, wherein the connection faces of the spring body assigned to the rods/shafts are to be understood as force-input and force-output sections. Should the deformation body be produced in one piece with the actuating shaft or actuating rod to be coupled, the force-input and force-output sections are to be understood as the particularly stiff part region of the one-piece spring body, at which the elastic relative deformation, which is to be detected, of the, in particular, weakened deformation body begins. The deformation body is a constituent of the spring body or formed completely by the spring body and is a constituent of the force-transmitting part, which has a modulus of elasticity for torque loads and/or compression loads, which can be determined or is already known. The deformation body between the force-output section and the force-input section is coupled to both of the latter in such a manner that the force accommodated by the force-input section is transmitted particularly essentially completely or at least predominantly—for example more than 50% or at least more than 20% of the force to be transmitted—into the force-output section when passed through the deformation body. All forces to be transmitted should preferably be conveyed by force transmission through the deformation body, in order to realise the subsequent calculation process for absolute determination of the force value as accurately as possible, with the smallest possible computing power.

In an alternative exemplary embodiment, the deformation body of the spring body according to the exemplary embodiment forms part of an actuating rod, an actuating shaft, a drive rod or a drive shaft and/or is arranged inside a drive housing or valve housing. In particular, drive rod and actuating rod or drive shaft and actuating shaft can be constructed in one-piece, preferably in a materially-bonded manner, with the deformation body.

Furthermore, the deformation body preferably has a shape adapted with respect to the deformation movement to be performed, particularly a profiling, by means of which the deformation body performs a predetermined elastic relative deformation movement, caused by the loading force to be transmitted, at a defined point in particular on the outside of the deformation body. The deformation body is in particular adapted to the loading force to be expected with regards to an even stress distribution, preferably in terms of the longitudinal direction thereof, in order to realize a homogeneous deformation movement and a predictable displacement of the defined point. During the relative deformation movement, the predetermined point on the deformation body moves with respect to a stationary component, for example a housing structure of the force transducer or a functional part adjacent thereto, for example a field device, such as a position controller, a drive housing, a valve housing or a carrier yoke arranged therebetween, where at least one sensor apparatus for detecting the relative deformation movement is arranged. The sensor can detect the relative deformation movement for example optically, particularly laser-optically, inductively, capacitively and/or magnetoelastically. The relative deformation movement indirectly gives information, with the aid of particularly linear calculation models which can be executed by means of electronic logic components, about the absolute value of the force to be detected, by determining the modulus of elasticity between the force-input section and the point under consideration in advance and using it accordingly. When detecting the relative deformation movement between the stationary sensor apparatus and the at least one predetermined point, the loading force introduced can be calculated, quite easily in particular, if the residual constituents of the force-transmitting part, such as the shaft or rod are realized to be essentially deformation resistant. An electronic analyser can be provided for example, which is coupled in an information-transmitting manner to the force transducer, namely the sensor.

Furthermore, the spring body has at least one coding sampling section at the predetermined point, which should interact with the stationary sensor apparatus in particular contactfree. The coding sampling section is attached or constructed in such a manner at the at least one point of the deformation body that it follows all deformation movements of this point. In this case, the coding sampling section can be formed on the deformation body itself or fastened by means of a separate component rigidly and immovably on the deformation body, namely at the at least one point. In this manner, it is possible that all of the forces acting on the deformation body can be measured with the aid of the known modulus of elasticity between the at least one point and the force-input section. The sensor apparatus assigned to the coding sampling section scans or samples the coding sampling section, in order to detect the deformation movement, particularly the maximum deformation movement amplitude. Using the force transducer according to the exemplary embodiment, it is not only possible to detect both torques as well as tension and compression forces using a single spring body/deformation body, rather, using the force transducer according to the exemplary embodiment, a simply constructed measuring cell can be provided, which can be produced in just one manufacturing step for example, namely as a spring body formed as one piece, without having to add additional constituents. Preferably, the deformation body, particularly the entire spring body, is realized from one piece of material, such as a non-magnetic metal or plastic. As an example, aluminum has sufficient strength and the lowest possible magnetic behaviour.

In a preferred exemplary embodiment, two different coding sampling sections are located in the particularly immediate vicinity of one another, wherein one of the coding sampling sections is used for determining a translational loading force, while the other coding sampling section is used for determining a loading moment, which are introduced into the deformation body. Both the tension/compression-force coding sampling section as well as the torque coding sampling section are assigned their own sensor apparatus in each case, so that the deformation movements of the respective coding sampling sections can be detected separately from one another, in order to determine the relative movement therefrom.

Preferably, the at least one sensor is attached in a fixed, i.e. stationary manner with respect to the relative deformation movement of the spring body, so that even cable-routing information transmission to an analysis unit can be realised readily even in the case of rotational spring bodies. Cable laying up to the spring body is obsolete according to the invention.

On the basis of the measured values of the first and second sensor apparatus relating to the torque and the tension/compression load, the respective individual torque or tension/compression components can be filtered and calculated therefrom by means of appropriate compensation computing steps of the analysis unit. This can be realised by a local analysis unit or carried out by a superordinate control center.

The measured values of the first and/or second sensor apparatus are used by the analyzer or the control center directly for a diagnostics function, for example for examining whether there is a defect present, such as a broken actuating rod. Such a diagnostics function can also take place on the basis of filtered individual torque or tension/compression components.

The analyzer can have a threshold value detector, which generates a warning signal, in particular in order to abort a test, if a predetermined threshold value is exceeded or is fallen below by the particularly analogue signal from the first and/or second sensor, which represents the measured values. The analysis unit can also have one or a plurality of threshold value detectors, in order to define a predetermined signal range on the basis of an upper and a lower threshold value, wherein the threshold value detector(s) are designed to generate the warning signal in the event of a departure from the predetermined signal range.

Preferably, at least one sensor apparatus has a limit value detector for generating a digital limit value signal in particular as a consequence of a predetermined limit value, particularly a force and/or torque limit value, being exceeded or fallen below by a measured value. A sensor with limit value detector can, in this respect, be used as a limit value signal generator.

In a preferred exemplary embodiment, the deformation body is structured such that the one point with the at least one coding sampling section executes the deformation movement in a displacement direction, which changes as a function of the type of force introduced into the force-input section, such as tension force, compression force and/or moment. This means that, for example, a translational displacement direction, particularly of the torque coding sampling section, is performed for an introduced torque, while a rotational movement of the coding sampling section, particularly of the tension/compression coding sampling section, can be detected for an introduced tension or compression force. Preferably, when transmitting a torque to be detected, an axial spacing remains between the force-input section and the force-output section, i.e. the axial length of the deformation body, remains unchanged in the course of the entire deformation path of the at least one coding sampling section. This can be realized in that the force-input-side deformation body in view of the coding sampling section and the force-output-side deformation body are formed mirror symmetrically to a plane of symmetry which is horizontal or extends in the radial direction, but the deformation bodies have an opposite deformation behaviour. A specific structure of the deformation body, which is axially symmetrical with regards to the coding sampling section, is explained in detail below.

In a preferred exemplary embodiment, the deformation body is formed by at least two or three spring webs each for the force-transmitting coupling of the force-input section to the coding sampling section and the force-output section to the coding sampling section. The at least two or three spring webs can have an elongated rod or beam shape in particular of constant cross section in the longitudinal extent thereof. The cross-sectional configuration of the rod or beam cross section can be adapted in terms of shape to an approximately even stress distribution, particularly for different loading forces. The at least two or three spring webs can merge integrally into the coding sampling section. The at least two or three spring webs can merge integrally into the respective force-input section or force-output section. At the transitions of the spring bodies to the force-input and -output areas and the coding section, stepless roundings or radii are provided in order to minimise stress peaks at the transition regions. In this respect, an integral or one-piece construction of the deformation body for example from a metal, preferably from aluminum, or from plastic, is advantageous, because a weakly magnetic or non-magnetic material can be called upon preferably for the deformation body. With regards to a corresponding sensor, which is based on an inductive measuring system, it may be advantageous that a magnetic attachment is rigidly and immovably fastened or placed on the deformation body, particularly at the one point. For example, a circumferential ferrite ring is of particular interest.

In a preferred exemplary embodiment, the at least two or three spring webs of the force-input-side deformation body and also the force-output-side deformation body, preferably all spring webs, are dimensioned to essentially be of equal length. In addition or alternatively, the at least two or three spring webs can be arranged at a pitch angle to an axial direction, particularly a torsion and/or tension/compression axis, which pitch angle can be of essentially the same size for the at least two or three spring webs of the force-input-side deformation body and/or the force-output-side deformation body, preferably all spring webs, in the unloaded state of the deformation body. Preferably, the pitch angle is acute and in a preferred embodiment lies between 10° and 80°, particularly between 20° and 70°. In a preferred exemplary embodiment of the pitch angle is between 40° and 50°. In a preferred exemplary embodiment, the force-input section and the force-output section is formed with a transition area facing the webs, which extend in the radial direction in each case. The spring webs transition into the in particular planar transition area preferably as one piece or fastened thereon in two pieces, and in particular therefore form a type of pivot joint, in order to raise and incline themselves with respect to the transition area. At the foot of the spring web, in the transition region to the transition area, the spring webs may be reinforced in order to withstand the loading forces.

Preferably, the respective feet of the spring webs lie distributed in the circumferential direction essentially on a circle around the axis or the axial direction of the deformation body. Thus, the radial spacing of the feet of the spring webs from the axial direction of the spring body is of essentially the same size. The spring webs all extend skewed with respect to the axial direction of the spring body. The force-input-side spring webs are also arranged skewed with respect to one another in such a manner that no points of intersection occur, even if one imagines their extension. The same may apply for the force-output-side spring webs.

In a preferred exemplary embodiment, the at least two or three force-input-side spring webs and the at least two or three force-output-side spring webs merge into a disc- or ring-shaped central section of the deformation body. Preferably, the at least two or three force-input-side and force-output-side spring webs and the central section are produced in one piece. The central section particularly has a preferably rotationally symmetrical circumferential outer surface, which can be formed cylindrically at least partially. The coding sampling section is provided on the surrounding circumferential surface. In addition or alternatively, the central section of the deformation body can have two planar merging areas, which lie parallel in one radial plane in each case and are diametrically opposite one another, into which the at least two or three force-output-side and force-input-side spring webs merge, particularly integrally. Each spring web has a transition foot section, which is preferably arranged in such a manner at the merging surface that the transition foot section of each spring web of the at least two or three force-output side spring webs is axially opposite a transition food section of the spring webs of the at least two or three force-input-side spring webs at the diametrically arranged merging surfaces. In this manner, a particularly even deformation of the deformation body is realized in relation to the central section on the force-input side and on the force-output side.

In a development of the exemplary embodiment, less than ten, eight or seven spring webs are provided for the force-input-side deformation body and also for the force-output-side deformation body with regards to the central section, wherein in particular, the number of spring webs for the force-input-side deformation body and the force-output-side deformation body is the same and in particular is three or four.

In a development of the exemplary embodiment, the coding sampling section has at least one hill/valley profile. The hill/valley profile is used to configure the sensor quality to be particularly high-resolution, particularly if a GMR sensor arrangement or an optical sensor arrangement is used for the sensor, using which even small deformation movements of a few tenths of a millimeter can be detected and measured. The hill/valley profile can also have a type of toothed structure, on which the transitions from adjacent teeth are formed by geometric edges, which toothed structure optimizes the measurement resolution. The finer is the separation of the toothing of the tooth structures or of the hill/valley arrangement, the more precise is the measurement. Preferably, the width of a hill/valley or a tooth is smaller than 2 mm or 1 mm.

Preferably, the coding sampling section has a circumferential hill/valley profile, which extends in the circumferential direction with respect to the axial direction. Preferably, the direction of extent of the circumferential hill/valley profile does not have any axial direction component. The axial displacements of the central section of the deformation body can be detected using the circumferential hill/valley profile. In addition or alternatively, the coding sampling section can also have an axial hill/valley profile which extends in the axial direction. The direction of extent of the axial hill/valley profile preferably does not have any radial and circumferential components. Using the axial hill/valley profile, the relative pivoting movement of the coding sampling section can be detected, in order to measure the tension or compression force, which acts on the deformation body. The hills and valleys of the respective hill/valley profile can run parallel to one another, in order to obtain a high-resolution measurement, which is as precise as possible. If the coding sampling section has both a circumferential hill/valley profile and an axial hill/valley profile, then there is the option to measure both compression/tension forces and torques. Even combined compression/tension forces and torques can be selectively detected using the spring body according to the exemplary embodiment. Only one spring-body structure is necessary in this case, wherein the corresponding coding sampling section is to be configured.

For selective measurement of the compression/tension forces and the torques, preferably two sensors are provided. One sensor detects the tension/compression coding sampling section, which moves, particularly rotates, in accordance with the deformation body proportionally to a tension/compression force. A different sensor detects the torque coding sampling section, which moves, particularly moves translationally, proportionally to an introduced torque. In this manner, tension/compression forces and torques can simultaneously be detected separately from one another. This can be measured not only in the case of static operating states of the spring body, but also in the case of rotating operating movements, without data or energy having to be transmitted from a rotor to a stator. Of course, the torque or tension/compression forces can also be measured exclusively using only one single sensor. To improve the measurement accuracy, a sensor can also comprise a plurality of individual sensors, which are arranged on the circumference, in the vicinity of the coding sampling section. Among others, mechanical concentricity errors are compensated herewith.

If the force transducer according to the exemplary embodiment shall only be used for measuring torques (and tension/compression forces are negligible in terms of measurement technology), then a roller bearing which prevents an axial displacement of the force-input region with respect to the force-output region is sufficient for the spring body. Under certain circumstances, it may be helpful to slightly axially prestress the force-input region with respect to the force-output region, particularly against a spring action of the spring webs. This prevents an undesired axial play and increases the measurement accuracy. Should tension/compression forces and torques be measured together in one force transducer, then one of the two bearings or an additional bearing must allow an axial displacement of the force-input region with respect to the force-output region relative to the elastic spring webs.

The force transducer with a spring body comprises a sensor assigned to the coding sampling section for in particular contactless sampling of the coding sampling section. Preferably, the sensor is a high-resolution GMR sensor arrangement, which provides at least one MR chip and at least one small bias large magnet for generating a magnetic field. The GMR sensor arrangement is to be arranged in the vicinity of the coding section.

Preferably, the force transducer has a rigid housing, on the inside of which the sensor is arranged. The rigid housing surrounds the spring body completely in the circumferential direction and can for example be realized in a cylindrical shape on the outside and/or on the inside. The housing is supported on the spring body, particularly on the force-input section and/or on the force-output section, by means of roller bearings.

The exemplary embodiment also relates to a force-transmitting part, such as an actuating rod or an actuating shaft, of a field device/actuating device, the pneumatic drive of which sets an actuating armature, such as a control valve. In this case, the exemplary embodiment can also be aimed at the field device/actuating device itself. According to the exemplary embodiment, the spring body is integrated as a force-transmitting part section in the force-transmitting part in a force-transmitting manner.

Further properties, advantages and features of the exemplary embodiment are explained by the following description of preferred exemplary embodiments on the basis of the attached drawings.

In FIGS. 1 and 2, a spring body according to the exemplary embodiment for use as a measuring shaft for determining torques to be transmitted by the spring body is generally provided with the reference numeral 1.

The spring body 1 is designed to be integrated into a shaft structure, which is comprised of two shaft sections (not illustrated), a force-input shaft and a force-output shaft, wherein the spring body 1 constructed as a measuring shaft is to be inserted between the shafts. For connection to the respective shafts, the spring body 1 comprises a force-input section 3 for receiving the torque M and a force-output section 5 for transmitting the torque further.

The force-input section 3 and the force-output section 5 at least have the same diameter or width dimension as the shafts to be coupled (not illustrated) and are divided into a cylindrical fastening peg 7, 11 and a cylindrical reinforcement transition section 13, 15. The fastening peg 7, 11 and the reinforcement transition section 13, 15 are realized to be deformation resistant and preferably have a passage 10, in order to allow a guide arm or an anti-breakage rod to pass through the spring body 1. A guide arm of this type is indicated in FIG. 4 with the reference numeral 71, wherein the guide arm 71 is immovably securely connected exclusively to the force-output section 5 or to the force-input section. At the respectively other force-output section (3 or 5), unguided passing through the passage 10 is realized, so that a movability between the force-input section and the force-output section 5 is provided.

The deformation body 9 is generally arranged between the force-output section 5 and the force-input section 3, which deformation body couples the two force-output sections 3, 5 to one another in a non-positive fitting manner for transmitting all actuation forces. From the reinforcement transition region 13, 15, the deformation body 9 is realized to be considerably weaker in terms of deformation, i.e. the force-output sections 3, 5 are considerably more deformation resistant. The associated, slight deformation of the force-input section 3 and the force-output section 5 is negligible during the determination, particularly calculation, of the absolute force value.

At the reinforcement transition section 13, 15, three spring webs 21, 23, 25 for forming the force-input-side deformation body part 19 extend at an acute angle α of approximately 45° with respect to a horizontal direction H, which corresponds to the radial direction. Also, the spring webs 31, 33, 35 extend at the same angle α from the reinforced transition region 15, in order to form the force-output-side deformation body part 29. A central section 41 is part of the deformation body in a rotationally shaped ring shape in an axially symmetrical center of the spring body 1 and defines a peripheral circumferential surface 43, on which three projections 45a, 45b, 45c protrude in a sharp-edged manner running around the ring. The ring-shaped central section 41 is considerably more deformation resistant than the spring-web structures adjoining on the force-input side and force-output side thereof. The central section 41 has a passage 20, which is so large that, should a guide arm 71 be implemented, a free rotational movability of the central section 41 is possible, without contacting the guide arm 71 in the operating states.

Both the force-input section 3, the force-output section 5 as well as the force-input-side spring webs 21 to 25 and the force-output-side spring webs 33 to 35 and the central section 41 of the spring body are constructed in one single integral piece from an, in particular, non-magnetic piece of metal, such as one piece of aluminum. A sufficiently strong plastic material or polymer material with regards to the forces to be measured can also be used.

During operation of the spring body 1 as part of the force transducer 73, which is illustrated in detail in FIG. 3, all of the forces to be detected, such as the torque M, are transmitted via the force-input section 3 to the deformation body parts (19, 29, 41) and to the force-output section 5, so that the deformation body 9 experiences an elastic deformation, the purely axial movement amplitude of which can be measured at the central region 41. Therefore, the central region 41 has constructed a coding sampling section 51 in the form of circumferential ring projections 45a to 45c on the circumferential surface 43. Instead of the ring projections 45a to 45c, the coding sampling section 51 can have different contours, edges or even a simple pure cylindrical circumferential surface, particularly if the coding sampling section is realised as a magnetic constituent of the central region. Then, the smallest axial movements of the coding sampling section can be detected already when using a high-resolution GMR sensor. Preferably, the ring projections 45a to 45c are provided, which improve the resolution of the sampling. The coding sampling section 51 or scanning section can also be an optically detectable element, which can be recognized by an optical sensor. It is clear that mechanical sampling or scanning sensors can also be used, which lie in direct roll-off or run-off contact with the coding sampling section 51, in order to determine the deformation movement at the central region 41.

In the spring bodies 1 illustrated in FIGS. 1 to 3, the particular kinematics of the deformation body 9 consists in that in the case of a circumferentially orientated torque load, the effectively detectable deformation movement of the deformation body 9 leads to an axial movement of the coding section, which is perpendicular to the circumferential orientation, due to the web arrangements. For this reason, the ring projections 45a to 45c run in the circumferential direction, so that an axial displacement of the central region 41 and therefore of the coding sampling section 51 can be detected most easily.

Both at the force-input section 3 and at the force-output section 5, a visual display 75, 77 is introduced in the form of a groove, in order to illustrate a rotation of the force-input section 3 with respect to the force-output section 5, which can be seen in FIGS. 5a and 5b in particular.

The force transducer 73 according to the exemplary embodiment has the spring body 1 and also a cylindrical housing part 61, which is mounted via roller bearings 63 on the respective force-output section 5 and force-input section 3.

A sensor 65 is arranged adjacently to the coding sampling section 51 at the axial height of the central section 41. If the coding sampling section 51 performs an axial movement, this movement is detected by the sensor 65, which may be a GMR sensor for example, due to the change in the magnetic field. Preferably, the coding sampling section 51 is a metal ring, such as a ferrite ring, pulled onto the central region 41, using which a particularly precise measurement is enabled.

In FIG. 4, the further embodiment of a spring body according to the exemplary embodiment is generally shown with the reference number 1, wherein the same reference numbers have been used for the same or identical components.

The spring body 1 differs from the spring body according to FIGS. 1, 2 and 3 in that a special central section 41' is used, which is realized to be somewhat wider and, for forming the coding sampling section 51, includes both the ring projections 45a to 45c as well as a plurality of axially parallel extending projections 81. The spring body 1 is for example accommodated in the housing part 61 in such a manner that the vertically running projections 81 are likewise opposite the sensor 65.

Figures 6A, 6B:
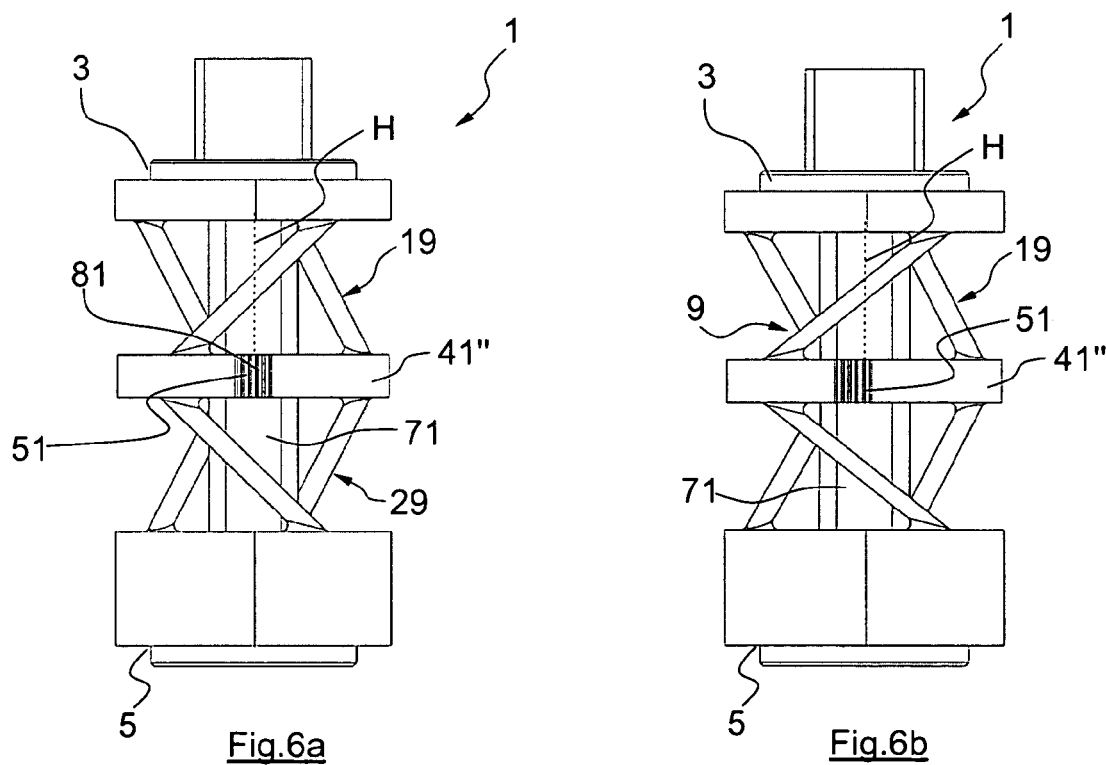
FIGS. 6a and 6b show side views of the spring body according to FIG. 4 in two operating states in the case of axial compression loading.

With the embodiment according to the spring body according to FIG. 4, it is possible to detect both compression forces/tension forces and torques using one spring body. When using compression forces, as can be seen in FIGS. 6a and 6b, the deformation body 9 allows an axial movement towards one another of the force-guiding sections 3, 5, wherein a pivoting movement of the central section 41 or 41' or 41" is realized in a radial plane, however.

This circumferential deformation movement of the central section 41' can be detected by the sensor 65 by means of the vertically running projections 81.

The sensor 65 can be connected to a computer, which is not illustrated in any more detail and can determine the exact value of the compression or tension force on the basis of the known modulus of elasticity of the deformation body, including the further constituents.

As can be seen in FIG. 4, as described already above, the spring body 1 comprises a guide arm 71, which is fastened on the force-output section 5 and extends contactlessly through the central section 41' to the force-input section. No torques or compression/tension forces are transmitted via the guide arm 71.

In FIGS. 5a and 5b, the spring body 1 is as in FIG. 1, wherein a guide arm 71, which can be constructed as above, is additionally provided.

When a torque M is introduced, the central section 41 and therefore the coding sampling section 51 are displaced in the axial direction around the deformation path v, which displacement path is detected by the sensor 65. The torque can be determined on the basis of the known modulus of elasticity and in particular also from empirical values, which torque is transmitted via the deformation body 9 from the force-input section 3 to the force-output section 5.

In FIGS. 6a and 6c, the compression operating state is illustrated, wherein the dashed auxiliary line illustrates the circumferential displacement, which corresponds to the deformation of the deformation body 9. This circumferential displacement can be detected by the sensor 65 on the basis of the vertical projections 81 of the central section 41".

As indicated in FIG. 4, the central section 41 and 41' can be combined in order to realize the central section 41', via which both compression and tension forces as well as torques can be detected, by detecting the circumferential displacement or the axial displacement using the sensor.

Figure 7:
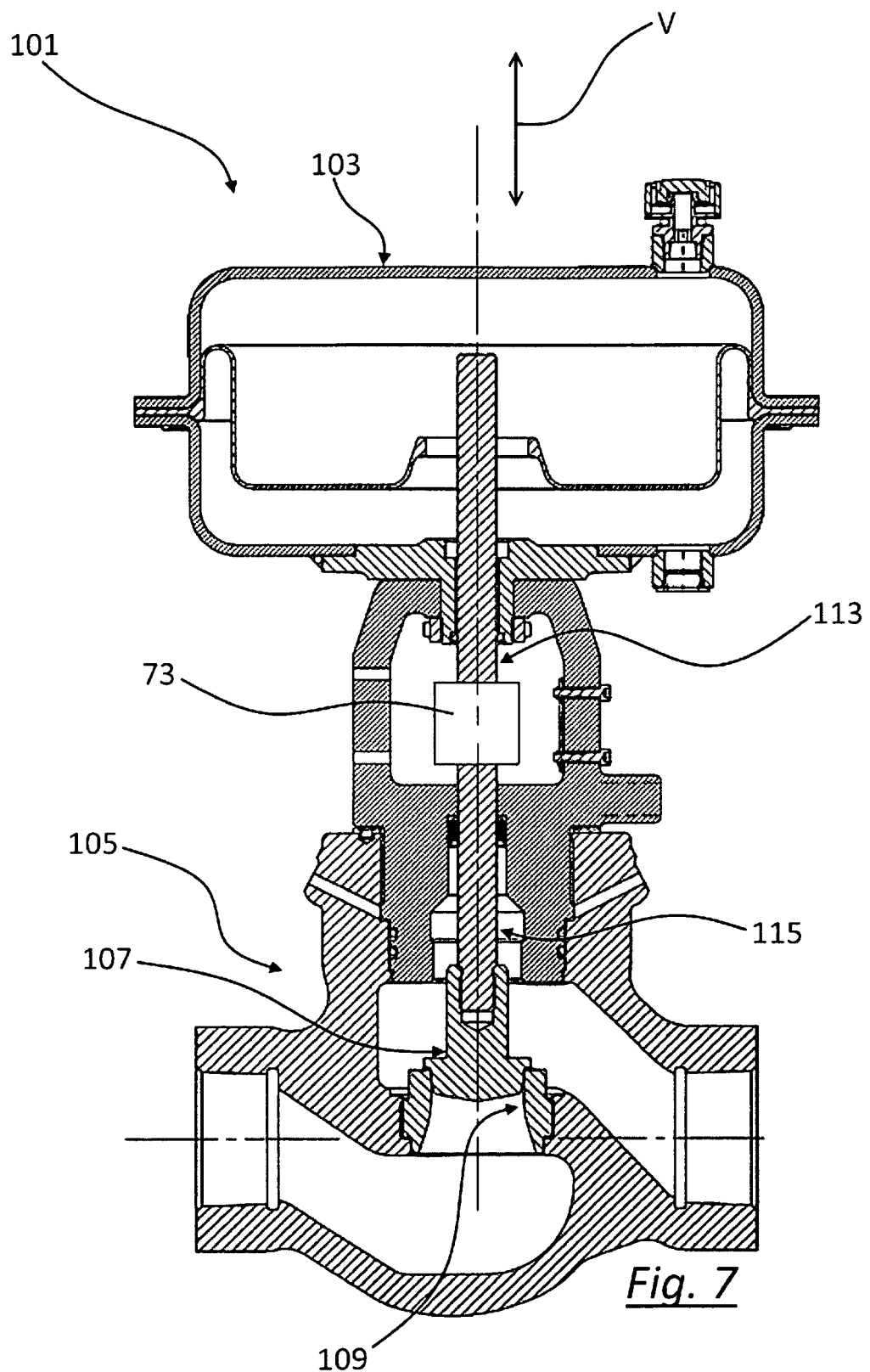
FIG. 7 shows a schematic illustration of an actuating device according to the exemplary embodiment with a stylized force transducer according to the exemplary embodiment.

FIG. 7 shows a field device 101, which has a pneumatic actuating drive 103, via which a control valve 105 of the field device 101 is operated. The field device 101 has an actuating armature with a translationally movable valve member 107, which armature is realized as control valve 105. An actuating rod 111 and a drive rod 113 are provided for transmitting the actuating force from the actuating drive 103 to the valve member 107.

In FIG. 7, a force transducer 73 provided between the actuating rod 111 and the drive rod 113 of the field device 101 is illustrated purely schematically. The force transducer 73 comprises a spring body (not illustrated in any more detail in FIG. 7), which transmits the actuating force provided by the actuating drive 103 for the control valve 105. A valve member 107 is provided as the actuating member, which can interact with a valve seat 109 in a sealing manner and which can be moved translationally in the vertical or axial direction V of the rods 111, 113, so that in the illustrated embodiment, the actuating force applied during the closing of the control valve 105 is a compression force and the actuating force provided for opening the valve 105 is a tension force. It is clear that a different embodiment of a field device (which is not illustrated in any more detail), even a different actuating armature and/or a different actuating drive can be provided, for example an actuating armature can be constructed as a control valve or as a regulating valve including a rotationally movable throttle valve, to which a rotational actuating force, i.e. an actuating torque, is provided by the actuating drive, which can accordingly be realized as a pivoting drive.

The features disclosed in the above description, the figures, and the claims can be of significance individually as well as in any combination for the realization of the invention in the various configurations thereof.

REFERENCE LIST

1 Spring body
3 Force-input section
5 Force-output section
7, 11 Fastening peg
9 Deformation body
10 Passage
13, 15 Reinforcement transition section
9, 19, 29 Deformation body part
20 Passage
21, 23, 25 Spring web
31, 33, 35 Spring web
41, 41', 41" Central section
43 Circumferential surface
45a, 45b, 45c Projection
51 Coding sampling section
61 Housing part
63 Roller bearing
65 Sensor
71 Guide arm
73 Force sensor
75, 77 Display
81 Projection
101 Field device
103 Pneumatic actuator
105 Control valve
107 Valve member
109 Valve seat
111 Actuating rod
113 Drive rod
H Horizontal direction
M Torque
V Vertical direction Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A spring body for a force transducer built into a force-transmitting part, comprising:
    a force-input section for receiving a force, a force-output section for transmitting the force, and an elastic deformation body arranged therebetween which couples the force-output section to the force-input section so that the force received by the force-input section is transmitted to the force-output section by the elastic deformation body, said elastic deformation body performing a predetermined elastic deformation movement caused by the force to be transmitted at at least one point defined on an outside of the elastic deformation body; and
    a coding sampling section provided at the at least one point of the deformation body and which follows all deformation movements of the at least one point, the coding sampling section being formed on the deformation body itself at the at least one point or being rigidly and immovable fastened on the deformation body at the at least one point using a separate component, wherein:
    the elastic deformation body is formed by a first plurality of spring webs configured to couple and transmit the force from the force-input section to the coding sampling section and a second plurality of spring webs configured to couple and transmit the force from the force-output section to the coding sampling section, each of the spring webs of the first and second plurality of spring webs including an elongated rod and being dimensioned to be substantially of equal length and arranged at an acute pitch angle to an axial direction;
    the elastic deformation body is structured so that the at least one point performs the deformation movement in a displacement direction which changes as a function of a type of force introduced into the force-input section, and
    the at least one point is configured to perform:
    a predominantly rotational movement in response to a translational tension or compression force; and
    a predominantly translational movement in an axial direction in response to a torque to be detected.

2. The spring body according to claim 1 wherein during the transmission of the torque, an axial spacing between the force-input section and the force-output section remains unchanged in a course of an entire deformation path of the coding sampling section at the at least one point.

3. The spring body according to claim 1, wherein a profile cross section of the elongated rod is adapted in terms of shape in a longitudinal extent of the spring web to a loading force to be expected so that a substantially even stress distribution is achieved inside a material forming the respective spring webs.

4. The spring body according to claim 3, wherein the pitch angle is substantially a same size for each of the spring webs of the first plurality of spring webs of the force-input-side deformation body and of the second plurality of spring webs of the force-output-side deformation body in an unloaded state of the deformation body.

5. The spring body of claim 1, wherein the spring webs of the first plurality of spring webs of the force-input-side deformation body and the second plurality of spring webs of the force-output-side deformation body are arranged in such a manner with respect to one another that when a torque load is introduced, the spring webs of the first plurality of spring webs of the force-input-side deformation body are raised while a pitch angle increases and the spring webs of the second plurality of spring webs of the force-output-side deformation body incline while the pitch angle is reduced.

6. The spring body of claim 1, wherein the spring webs of the first plurality of spring webs of the force-input-side deformation body and of the second plurality of spring webs of the force-output-side deformation body are arranged in such a manner with respect to one another that when a compression or tension force is introduced, the spring webs of the first and the second plurality of spring webs are raised or inclined with increase of a pitch angle or with a fall of the pitch angle, the coding sampling section performing a pivoting movement about the torsion and/or tension/compression axis.

7. The spring body according to claim 1, wherein the spring webs of the first plurality of spring webs of the force-input-side deformation body and of second plurality of spring webs of the force-output-side deformation body are arranged in such a manner with respect to one another that when compression or tension force is introduced, the spring webs of the first and the second plurality of spring webs are raised or inclined with increase of a pitch angle or with a decrease of the pitch angle.

8. The spring body according to claim 1 wherein the coding sampling section is configured to perform a pivoting movement about at least one of a torsion and a tension/compression axis.

9. The spring body according to claim 1 further comprising an elastically deformable pivot joint provided at a structural transition of at least two spring webs of the deformation body in a disc-shape central section of the deformation body, said pivot joint defining a horizontal pivot axis about which the respective spring web inclines or raises in a pivoting manner with respect to said central section depending on the force introduction.

10. The spring body according to claim 1, wherein:
the first plurality of spring webs and the second plurality of spring webs merge into a disc-shaped central section of the deformation body on which said coding sampling section is provided, and
two merging areas which lie parallel in one radial plane into which the spring webs of the first and the second plurality of spring webs merge, and a transition foot section of each spring web of the at least two force-output-side spring webs being substantially axially diametrically opposite a transition foot section of each of the at least two spring webs of the force-input-side.

11. The spring body according to claim 1, wherein, for the force-input-side deformation body and the force-output-side deformation body, less than six total spring webs are provided, and wherein a number of the first plurality of spring webs for the force-input-side deformation body and the second plurality of spring webs for the force-output-side deformation body are the same.

12. The spring body according to claim 1 in which the coding sampling section comprises at least one hill or valley profile.

13. The spring body according to claim 1 wherein the elastic deformation body is configured to transmit all of the force received by the force-input section to the force-output section.

14. A force transducer, comprising:
a spring body built into a force-transmitting part, said spring body comprising a force-input section for receiving a force, a force-output section for transmitting the force, and an elastic last deformation body arranged therebetween which couples the force-output section to the force-input section so that the force received by the force-input section is transmitted to the force-output section by the elastic deformation body, said elastic deformation body performing a predetermined elastic deformation movement caused by the force to be transmitted at at least at one point defined on an outside of the elastic deformation body, and
a coding sampling section at the least one point on the deformation body and which follows all deformation movements of the at least one point, the coding sampling section being formed on the deformation body itself at the at least one point or being rigidly and immovable fastened on the deformation body at the at least one point using a separate component, wherein:
the elastic deformation body is formed by a first plurality of spring webs configured to couple and transmit from the force-input section to the coding sampling section and a second plurality of spring webs configured to couple and transmit from the force-output section to the coding sampling section, each of the spring webs of the first and second plurality of spring webs including an elongated rod and being dimensioned to be substantially of equal length and arranged at an acute pitch angle to an axial direction,
the elastic deformation body is structured so that the at least one point performs the deformation movement in a displacement direction which changes as a function of a type of force introduced into the force-input section, and
the at least one point is configured to perform:
a predominantly rotational movement in response to a translational tension or compression force; and
a predominantly translational movement in an axial direction in response to a torque to be detected.

15. A force transducer according to claim 14 wherein said coding sampling section provides contactless sampling.

16. A spring body for a force transducer built into a force-transmitting part, comprising:
a force-input section for receiving a force, a force-output section for transmitting the force, and an elastic deformation body arranged therebetween which couples the force-output section to the force-input section so that the force received by the force-input section is transmitted to the force-output section by the elastic deformation body, said elastic deformation body performing a predetermined elastic deformation movement caused by the force to be transmitted at at least one point defined on an outside of the elastic deformation body; and
a coding sampling section provided at the at least one point on the deformation body and which follows deformation movements of the at least one point, the coding sampling section being formed on the deformation body itself at the at least one point or being rigidly and immovable fastened on the deformation body at the at least one point using a separate component, wherein:

the elastic deformation body is formed by a first plurality of spring webs configured to couple and transmit the force from the force-input section to the coding sampling section and a second plurality of spring webs configured to fore couple and transmit the force from the force-output section to the coding sampling section, each of the spring webs of the first and second plurality of spring webs including an elongated rod and being dimensioned to be substantially of equal length and arranged at an acute pitch angle to an axial direction, the elastic deformation body is structured so that the at least one point performs the deformation movement in a displacement direction which changes as a function of a type of force introduced into the force-input section, and the at least one point is configured to perform:

a predominantly rotational movement in response to a translational tension or compression force; and a predominantly translational movement in an axial direction in response to a torque to be detected.

* * * * *